(12) United States Patent
Kim et al.

(10) Patent No.: US 7,151,360 B2
(45) Date of Patent: Dec. 19, 2006

(54) POWER SUPPLY FOR POWER FACTOR CORRECTION AND DRIVING METHOD THEREOF

(75) Inventors: Bong Gyun Kim, Busan (KR); Nam Kyu Lee, Changwon-shi (KR); Hee Duk Oh, Kumi-shi (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 10/893,267

(22) Filed: Jul. 19, 2004

(65) Prior Publication Data

US 2005/0013143 A1 Jan. 20, 2005

(30) Foreign Application Priority Data

Jul. 18, 2003 (KR) .............. 10-2003-0049268

(51) Int. Cl.
*G05F 1/10* (2006.01)
(52) U.S. Cl. .............. 323/222; 323/285; 363/79
(58) Field of Classification Search .............. 363/79, 363/81, 89, 21.12, 126, 16–20, 95, 97, 21.14; 323/222, 207, 282–285
See application file for complete search history.

(56) References Cited

U.S. PATENT DOCUMENTS 4,437,146 A * 3/1984 Carpenter .............. 323/222
5,617,013 A * 4/1997 Cozzi .............. 323/222
6,031,748 A * 2/2000 Hong .............. 363/89
6,650,092 B1* 11/2003 Lidak et al. .............. 323/207

FOREIGN PATENT DOCUMENTS

JP 10-032977 2/1998

OTHER PUBLICATIONS

Korean Office Action dated Aug. 24, 2005.

* cited by examiner

*Primary Examiner*—Rajnikant B. Patel
(74) *Attorney, Agent, or Firm*—Fleshner & Kim LLP.

(57) ABSTRACT

A power supply for power factor correction and a driving method thereof wherein a ripple current of a power factor correction circuit (PFC) can be reduced to enhance a power factor and an efficiency. In the power supply, a power factor correction circuit corrects a power factor of a AC voltage supplied from an AC voltage source using a switching device to convert it to a DC voltage. A DC to DC converter converts said DC voltage from the power factor correction circuit into a desired DC voltage. A controller controls the switching device in accordance with an input voltage inputted to the power factor correction circuit to vary an output voltage of the power factor correction circuit.

21 Claims, 10 Drawing Sheets

POWER SUPPLY FOR POWER FACTOR CORRECTION AND DRIVING METHOD THEREOF

This application claims the benefit of Korean Patent Application No. P2003-49268 filed in Korea on Jul. 18, 2003, which is hereby incorporated by reference.

BACKGROUND OF THE INVENTION

1. Field of the Invention

This invention relates to a power supply, and more particularly to a power supply for power factor correction and a driving method thereof wherein a ripple current of a power factor correction circuit (PFC) can be reduced to enhance a power factor and efficiency.

2. Description of the Related Art

Recently, there have been more activated applications of a power supply having stable, small size and light weight properties in a factory automation equipment, an office automation equipment, an information equipment, a communication equipment and a power supply, etc. Furthermore, a harmonic wave reduction and a power factor correction of an input current of the power supply have been issued as an important problem due to an expanded interest for a harmonic wave interference and an adoption of a harmonic wave limit standard.

Generally, a switching power supply can be divided into a rectifier for converting an alternating current (AC) input into a direct current (DC), and a DC to DC converter for stabilizing the DC input from a load variation and a change of input voltage. A capacitor input type rectifying circuit having largely been used as a DC power supply for various electronic equipments requires a large capacitance value of capacitor for the purpose of restraining an input voltage variation of the DC to DC converter to reduce a burden of a device.

However, as a capacitance value of a capacitor goes larger, a larger pulse-type current for storing a lot of energy for a short time flows. In this case, a peak value thereof becomes five to ten times larger than an effective value thereof. Since this large pulse-type current forces a shape of input current of the rectifier to be discontinuous, it makes an affect to peripheral devices due to a distortion of an input voltage and a harmonic component of an input current.

In order to overcome such problems, there has been suggested a scheme of adding a power factor correction circuit (PFC) to the DC to DC converter of the switching power supply. A circuitry for correcting a power factor in the existent power supply can be largely classified into a passive PFC and an active PFC.

Referring to FIG. 1, a power supply employing a conventional passive PFC circuit system includes a rectifier 10, consisting of four bridge diodes, for converting an AC input supplied from an AC voltage source Vin into a DC, an inductor L connected to one terminal of the rectifier 10, a capacitor C connected between the inductor L and other terminal of the rectifier 10, and a DC to DC converter 20 connected across the capacitor C to receive an energy stored in the capacitor C and convert it into a DC voltage.

Such a conventional power supply of passive PFC system limits a charge current of the capacitor C by an impedance value of the inductor L to thereby have an enlarged conduction angle and an improved power factor. The power supply of passive PFC system is mainly used for applications requiring a simple design, a low frequency band, a low electro-magnetic interference (EMI) and a high power.

Referring now to FIG. 2, a conventional power supply of active PFC system includes a rectifier 30, consisting of four bridge diodes, for converting an AC input supplied from an AC voltage source Vin into a DC, an inductor L connected to one terminal of the rectifier 30, a semiconductor switch Q1 connected between the inductor L and other terminal of the rectifier 30, a capacitor C between first and second terminals of the semiconductor switch Q1, a diode D1 connected to the first terminal of the semiconductor switch Q1 and the first terminal of the capacitor C, and a DC to DC converter 40 connected across the capacitor C to receive an energy stored in the capacitor C and convert it into a DC voltage.

The rectifier 30 rectifies an AC input supplied from the AC voltage source Vin using the bridge diodes, and stores it to the inductor L.

The semiconductor switch Q1 is controlled such that a current iL flowing in the inductor L follows an input voltage and a DC voltage Vc stored in the capacitor C is always constantly maintained at a larger value than a peak value of the maximum input voltage.

The DC to DC converter 40 receives an energy stored in the capacitor C and converts it into a required DC voltage depending upon a load connection (not shown).

As shown in FIG. 3, in such a power supply of active PFC system, an AC input is supplied from the AC voltage source Vin such that two diodes of the rectifier 30 are conducted during a half period of the AC input. At this time, if the semiconductor switch Q1 is turned on, an input voltage is applied to the inductor L to thereby linearly increase the current iL flowing in the inductor L and store an energy into the inductor L. At this time, a reverse voltage Vc from the capacitor C is loaded onto the diode D1 to thereby be turned off.

Then, if the semiconductor switch Q1 is turned off, then the diode D1 is conducted to apply a reverse voltage to the inductor L, thereby linearly decreasing the current iL flowing in the inductor L and storing the energy having been stored in the inductor L into the capacitor C. The energy Vc stored in the capacitor C is fed to the DC to DC converter 40 to be converted into a required DC voltage.

In such a conventional power supply of active PFC system, the semiconductor switch Q1 allows the DC voltage Vc stored in the capacitor C to be always constantly maintained at a larger value than a peak value of the maximum input voltage. In the case of a power supply supplying a power to a plasma display panel, the DC voltage Vc is maintained at approximately 380V to 400V, and is set to have an always lager value than 265V because the maximum value of the input voltage is 265V.

However, in this case, the current iL is linearly increased when the input voltage is applied to the inductor L, whereas the current iL is decreased when a difference between the output voltage and the input voltage of the capacitor C is applied thereto. Accordingly, as shown in FIG. 4, when an input voltage supplied via an input line is low, a difference between the DC voltage stored in the capacitor C and the input voltage is enlarged and hence a pulsation of the current iL flowing in the inductor L is enlarged. As the pulsation of the current iL is enlarged, a conduction loss of the semiconductor switch Q1 is increased and a power loss caused by resistance components of each device, thereby deteriorating a whole efficiency of the power supply. Furthermore, it needs a relatively large EMI filter due to the enlarged pulsation of the current iL. Moreover, as the pulsation of the current iL is enlarged, a current control characteristic is deteriorated to reduce a power factor.

SUMMARY OF THE INVENTION

Accordingly, it is an object of the present invention to provide a power supply for power factor correction and a driving method thereof wherein a ripple current of a power factor corrector circuit (PFC) can be reduced to enhance a power factor and an efficiency.

In order to achieve these and other objects of the invention, a power supply for power factor correction according to one aspect of the present invention includes an alternating current (AC) voltage source; a power factor correction circuit for correcting a power factor of a AC voltage supplied from the AC voltage source using a switching device to convert it to a direct current (DC) voltage; a direct current (DC) to direct current (DC) converter for converting said DC voltage from the power factor correction circuit into a desired DC voltage; and a controller for controlling the switching device in accordance with an input voltage inputted to the power factor correction circuit to vary an output voltage of the power factor correction circuit.

The power supply further includes a flat panel display device driven with said output voltage from the DC to DC converter.

The power factor correction circuit includes a rectifier for rectifying said AC voltage; a power factor corrector for correcting a power factor of the rectified voltage from the rectifier in response to a switching control signal from the controller; and a charge capacitor for storing an output voltage of the power factor corrector.

Herein, the power factor corrector includes said switching device connected between each output terminal of the rectifier; an inductor connected between a first output terminal of the rectifier and the switching device to store an energy supplied from the rectifier in response to a switching of the switching device; and a diode connected between the switching device and a first terminal of the charge capacitor to switching said energy stored in the inductor into the charge capacitor in response to a switching of the switching device.

The power factor corrector further includes a high-frequency capacitor connected between a node positioned between the first output terminal of the rectifier and the inductor and a second output terminal of the rectifier.

The power supply further includes a detector for detecting an output voltage of the power factor correction circuit to apply it to the controller; and a soft starter for detecting an input voltage of the power factor correction circuit to apply it to the controller.

The controller includes a reference voltage source for generating a reference voltage, wherein the controller generates said switching control signal for controlling said switching of the switching device using the detected input voltage from the soft starter, said reference voltage and the detected output, voltage from the detector.

The controller includes an offset voltage amplifier for amplifying and outputting an offset between said reference voltage linearly increased by the detected input voltage from the soft starter applied a first terminal thereof and the detected output voltage from the detector applied to a second terminal thereof; a voltage controller for making a control such that an offset voltage between said reference voltage linearly increased in accordance with an output voltage of he offset voltage amplifier and the detected output voltage from the detector is minimized; a current generator for generating a reference current using an output voltage and, a sine wave from the voltage controller and said inductor current; and a current controller for generating said switching control signal using said reference current from the current generator.

The detector includes a first resistor supplied with an output voltage of the charge capacitor; and a second resistor connected between the first resistor and a ground voltage source, wherein a first node between the first resistor and the second resistor is connected to a second terminal of the offset voltage amplifier.

The soft starter includes a third resistor supplied with a voltage of the high-frequency capacitor; a fourth resistor connected between the second resistor and the ground voltage source; and a holding capacitor connected between a second node positioned between the third and fourth resistors and the ground voltage source, said second node being connected to the first terminal of the offset voltage amplifier.

Herein, resistance values of the third and fourth resistors are set such that a peak value of said input voltage is approximately 1 to 10% larger than a peak value of the detected output voltage from the detested.

The current generator includes a multiplier for outputting a current corresponding to said output voltage of the voltage controller using said output voltage and said sine wave from the voltage controller; and an adder for generating said reference current using said current outputted from the multiplier and said inductor current.

A method of driving a power supply for power factor correction according to another aspect of the present invention includes the steps of (A) correcting a power factor of an AC voltage supplied from an AC voltage source using a power factor correction circuit including a switching device and converting said AC voltage into a DC voltage; (B) converting said converted DC voltage into a desired DC voltage using a DC to DC converter; and (C) controlling the switching device in accordance with an input voltage inputted to the power factor correction circuit to vary an output voltage of the power factor correction circuit.

The method further includes the step of driving a flat panel display device using said output voltage from the DC to DC converter.

Said (A) step includes rectifying said AC voltage using a full-bridge rectifier; storing an energy supplied from the rectifier in response to a switching of the switching device using an inductor; charging said energy stored in the inductor into a charge capacitor in response to said switching of the switching device using a diode.

Said (A) step further includes smoothing an energy supplied from the rectifier to the inductor using a high-frequency capacitor.

The method further includes the steps of detecting an output voltage of the power factor correction circuit using a voltage-dividing resistance of first and second resistors; and detecting an input voltage of the power factor correction circuit using a voltage-dividing resistance of third and fourth resistors and a holding capacitor.

Herein, resistance values of the third and fourth resistors are set such that a peak value of said input voltage is approximately 1 to 10% larger than a peak value of the detected output voltage from the detected.

Said (C) step includes generating a reference voltage; generating said switching control signal for controlling said switching of the switching device using the detected input voltage, said reference voltage and the detected output voltage.

Herein, said step of generating said switching control signal includes amplifying an offset between said reference voltage linearly increased by the detected input voltage and the detected input voltage using an offset voltage amplifier; making a control such that an offset voltage between said reference voltage linearly increased in accordance with an output voltage of the offset voltage amplifier and the detected output voltage is minimized; generating a reference current using said minimized output voltage, a sine wave and said inductor current; and generating said switching control signal using said reference current.

Herein, said step of generating said reference current includes generating a current corresponding to said minimized output, voltage sing said minimized output voltage and said sine wave; and generating said reference current using said current and said inductor current.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Hereinafter, the preferred embodiments of the present invention will be described in detail with reference to FIGS. 5 to 10.

A power supply for power factor correction according to an embodiment of the present invention generates a direct current (DC) voltage for driving a driving apparatus of an factory automation equipment, an office automation equipment, an information equipment, a communication equipment, a power system and a flat panel display device, etc. Herein, the flat panel display device includes a liquid crystal display (LCD), a field emission display (FED), a plasma display panel (PDP) and an electro-luminescence (EL) display, etc.

The power supply for power factor correction according to the embodiment of the present invention will be described on the basis of the PDP of said driving apparatus. The PDP radiates a phosphorus material using an ultraviolet ray with a wavelength of 14 nm generated upon discharge of a gas such as He+Xe, Ne+Xe or He+Ne+Xe, to thereby display a picture including characters or graphics. Such a PDP is easy to be made into a thin-film and large-dimension type. Moreover, the PDP provides a very improved picture quality owing to a recent technical development. Such a PDP drives one frame, which is divided into various sub-fields having a different emission frequency, so as to realize gray levels of a picture. Each sub-field is again divided into a reset period for uniformly causing a discharge, an address period and sustain period. For instance, if it is intended to display a picture of 256 gray levels, then a frame interval equal to 1/60 second (i.e. 16.67 msec) is divided into 8 sub-fields.

The reset period and the address period of each sub-field are equal to each other for each sub-field. An address discharge for selecting the cell is generated by a voltage difference between the data electrode and the scan electrode. The sustain period is increased at a ratio of, $2^n$ (wherein n=0, 1, 2, 3, 4, 5, 6 and 7) at each sub-field. A sustain discharge frequency in the sustain period for each sub-field is controlled to supply a gray scale required for an image display. The sustain discharge is generated by a high voltage of sustaining, pulse alternately applied to the scan electrode and the sustain electrode.

Figure 1:
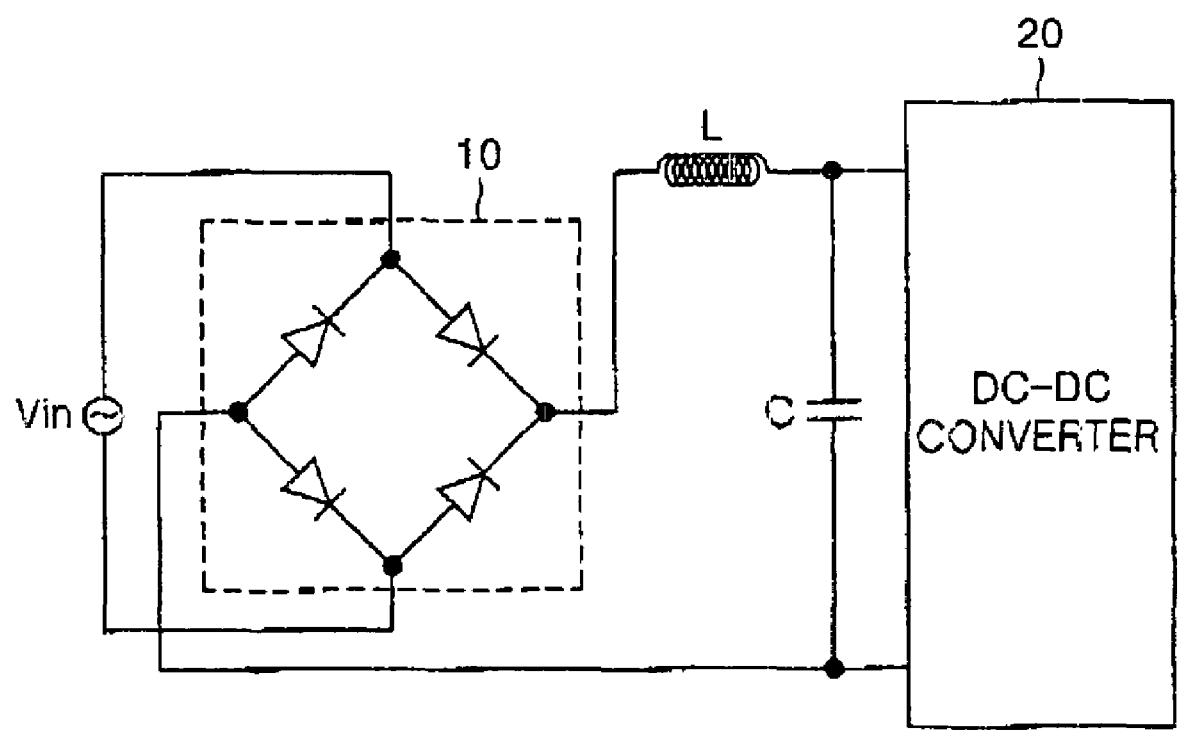
FIG. 1 is a circuit diagram showing a configuration of a power supply employing a conventional passive power factor correction system.
Figure 2:
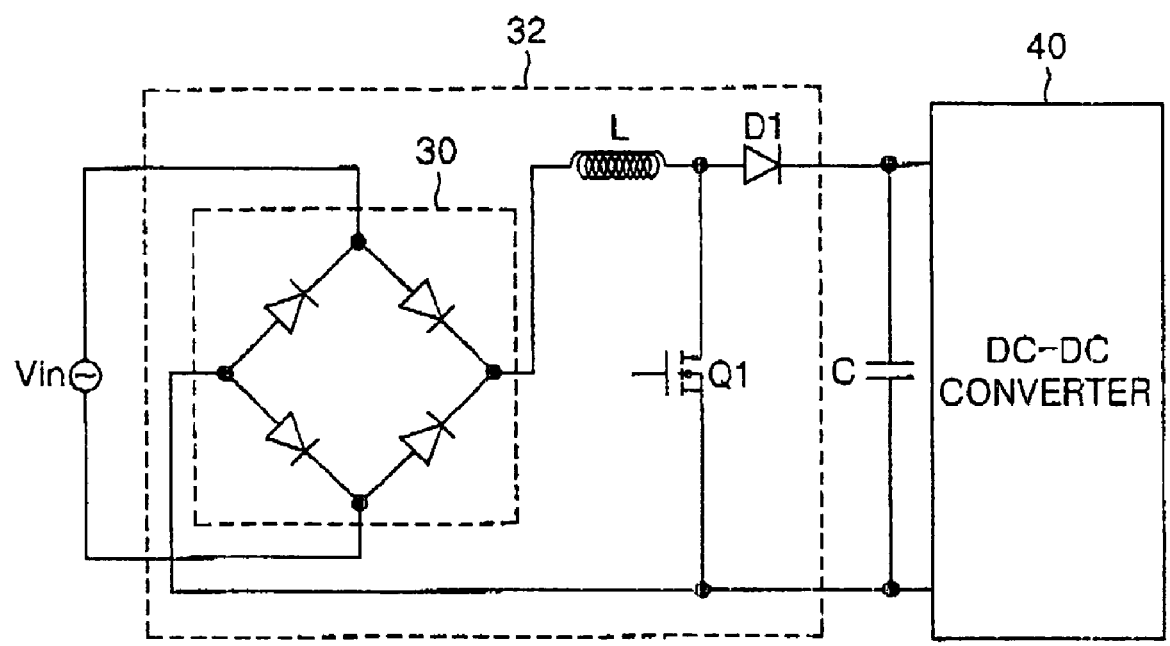
FIG. 2 is a circuit diagram showing a configuration of a power supply employing a conventional active power factor correction system.
Figure 3:
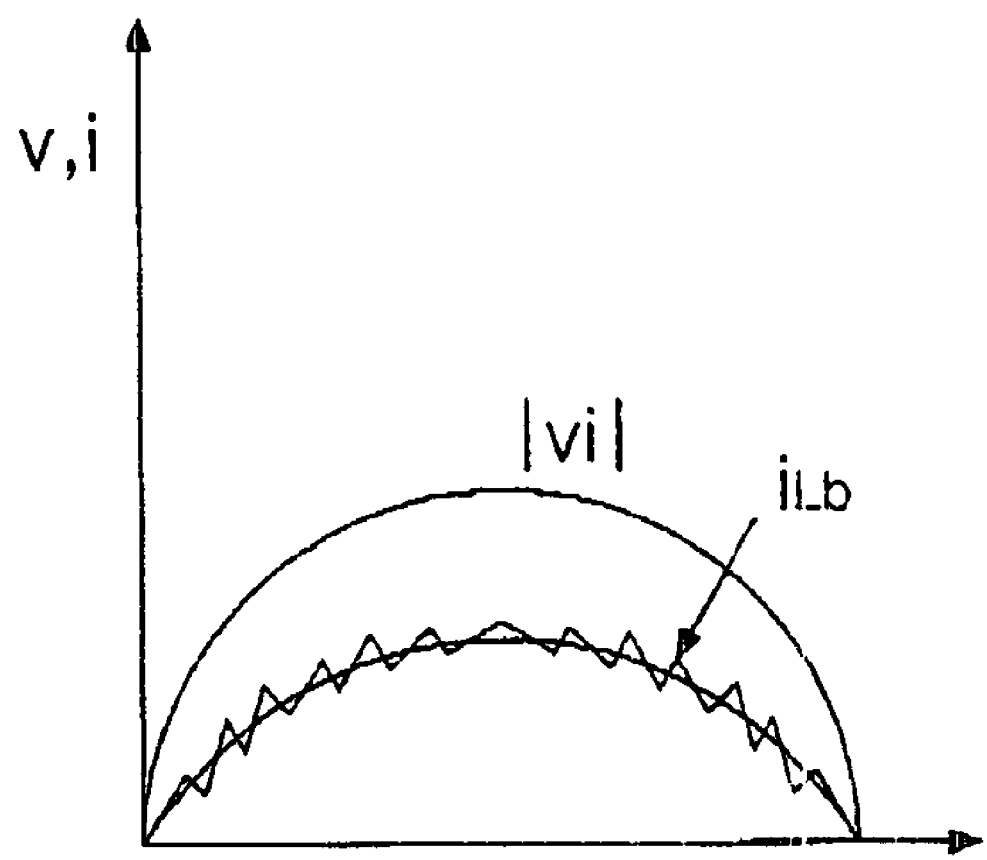
FIG. 3 is a waveform diagram representing a current of the inductor according to the input voltage shown in FIG. 2
Figure 4:
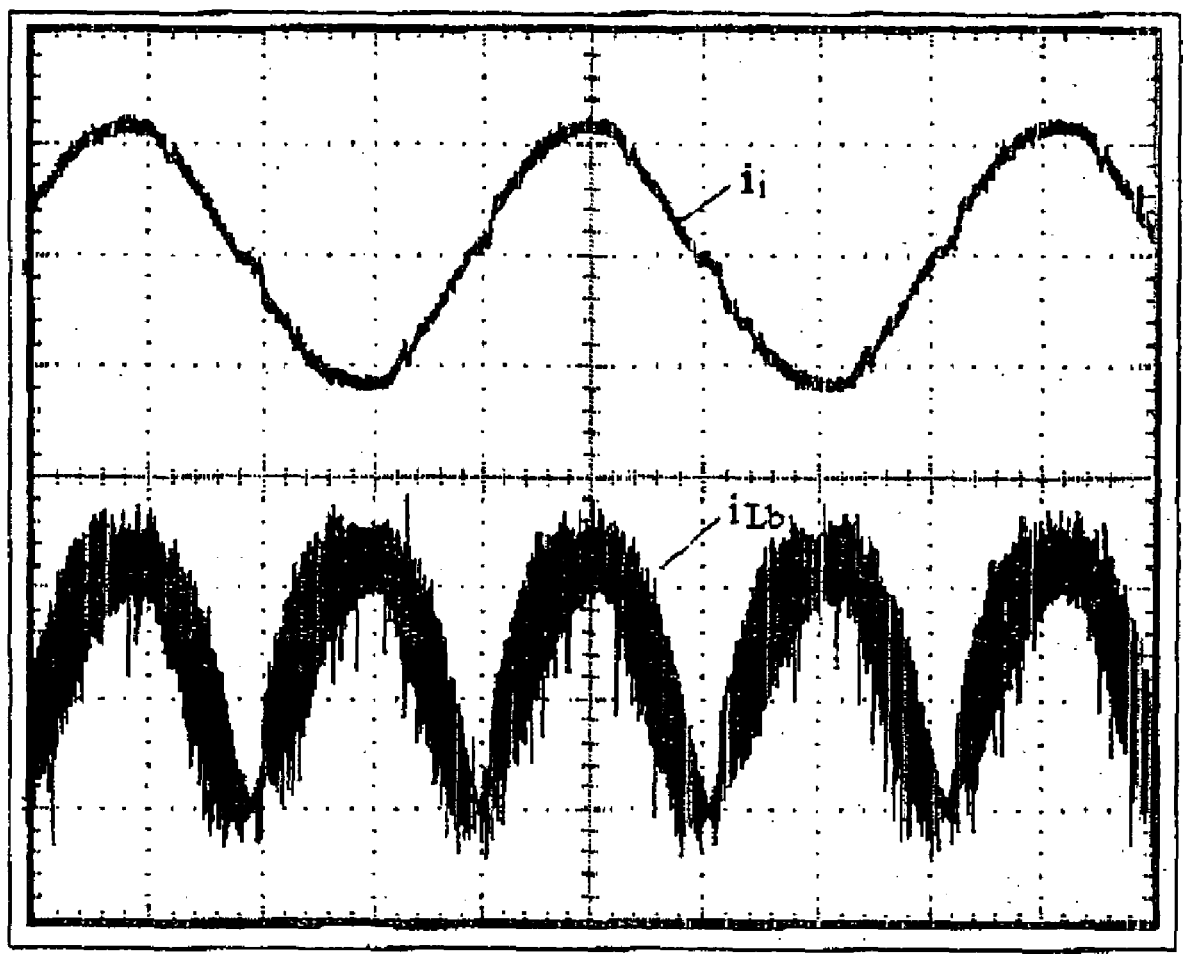
FIG. 4 is a waveform diagram representing an input voltage inputted to the power factor correction circuit and a current flowing in the inductor in the conventional power supply.
Figure 5:
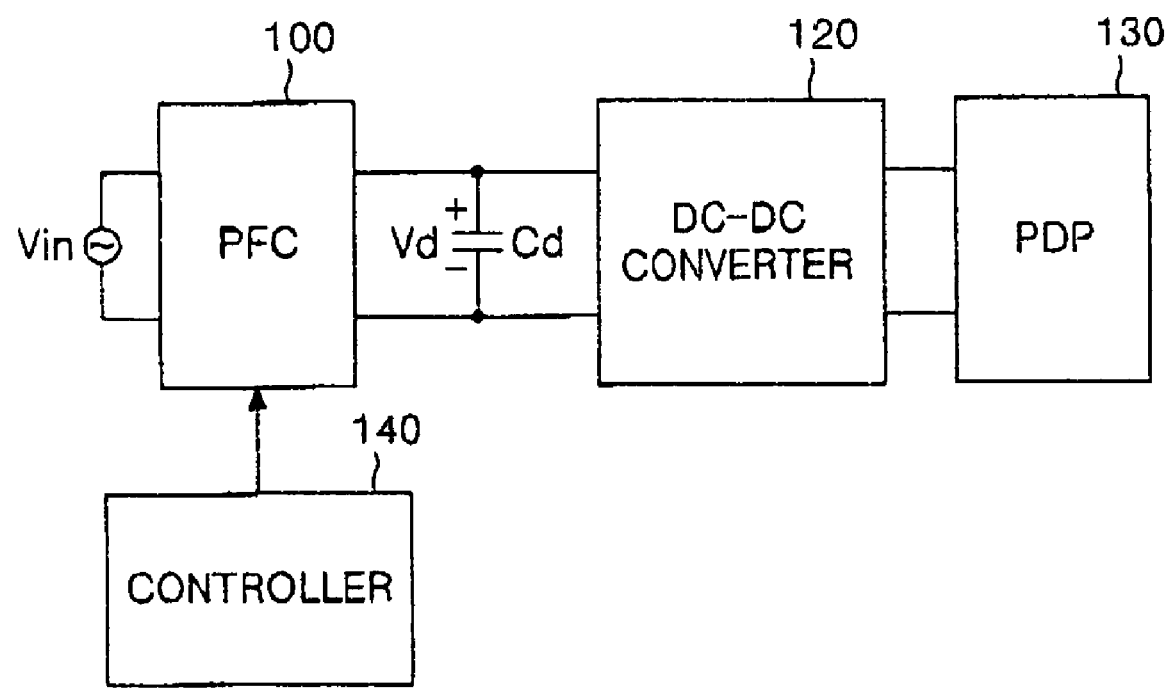
FIG. 5 is a block diagram showing a configuration of a power supply for power factor correction according to an embodiment of the present invention.
Figure 6:
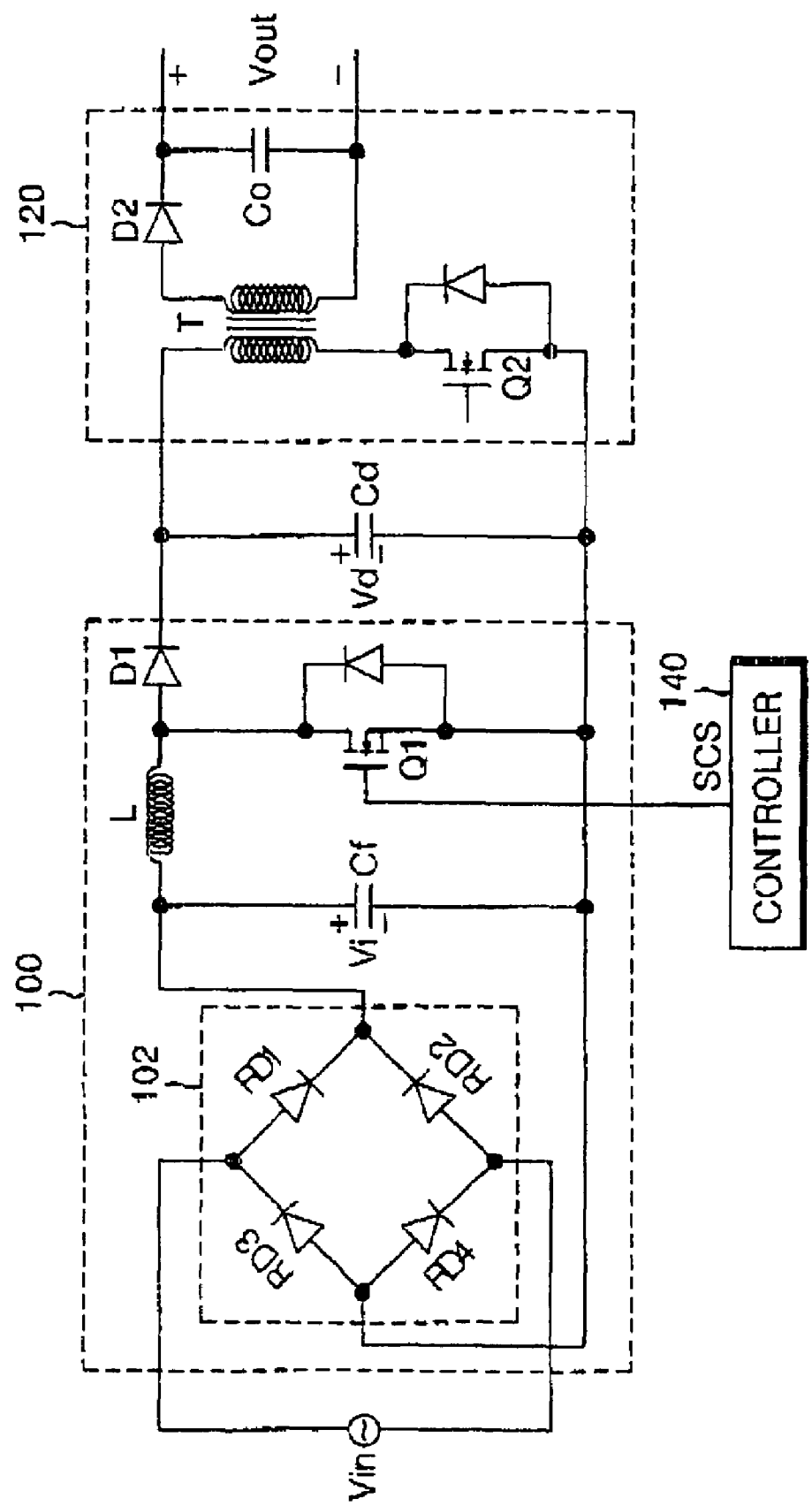
FIG. 6 is a circuit diagram of the power supply for power factor correction according to the embodiment of the present invention shown in FIG. 5.

Referring to FIG. 5 and FIG. 6, a power supply for power factor correction according to an embodiment of the present invention includes an AC voltage source Vin, a power factor correction circuit (PFC) 100 for rectifying an AC input supplied from the AC voltage source Vin, correcting power factors of the rectified voltage and current, and eliminating harmonic waves, a charge capacitor Cd for storing an output voltage of the PFC 100, a DC to DC converter 120 for stabilizing a voltage from the charge capacitor Cd from a load variation and a change of input voltage and applying the stabilized voltage to the PDP 130, and a controller 140 for controlling a magnitude of an output voltage of the PFC 100 in such a manner to correspond to an input voltage inputted to the PFC 100. In the power supply for power factor correction according to the embodiment of the present invention, the PFC 100 is driven in a continuous current mode (CCM) for the purpose of continuously operating a current of a boost reactor of the converter to enhance an efficiency.

The PFC 100 includes a full-bridge rectifier 102 for rectifying an AC input supplied from the AC voltage source Vin, a high-frequency capacitor Cf connected to each output terminal of the full-bridge rectifier 102, a first semiconductor switch Q1 connected between first and second terminals of the high-frequency capacitor Cf to switch an energy from the full-bridge rectifier 102 into the inductor L in response to a switching control signal SCS from the controller 140, an inductor L connected between the first terminal of the high-frequency capacitor Cf and the first and second terminals of the first semiconductor switch Q1 to store an energy inputted from the full-bridge rectifier 102 in response to a switching of the first semiconductor switch Q1, and a first diode D1 connected between a node to which the second terminal of the inductor L and the first terminal of the first semiconductor switch Q1 and the first terminal of the charge capacitor Cd.

The full-bridge rectifier 102 rectifies an AC input supplied from the AC voltage source Vin in response to a switching of the first semiconductor switch Q1 and applies it to the inductor L. To this end, the full-bridge rectifier 102 consists of first to fourth rectifying diodes RD1 to AD4, and conducts two rectifying diodes RD1 and RD4 or RD2 and RD3 in accordance with a polarity of the input from the AC voltage source Vin to thereby rectify the AC input supplied from the AC voltage source Vin and apply it to the inductor L. In other words, the full-bridge rectifier 102 conducts the first, and fourth rectifying diodes RD1 and RD4 during a half cycle of the AC voltage Vin while conducting the second and third rectifying diodes RD2 and RD3 during the remaining half cycle thereof.

The high-frequency capacitor Cf smoothes an AC voltage rectified by the full-bridge rectifier 102 to apply it to the inductor L.

The inductor L stores a current from the full-bridge rectifier 102 when the first semiconductor switch Q1 is turned on, whereas it generates a reverse voltage by a conduction of the first diode D1 when the first semiconductor switch Q1 is turned off and applies the reverse voltage to the charge capacitor Cd.

The first semiconductor switch Q1 controls a current iL flowing in the inductor L in response to the switching control signal SCS from the controller 140.

Such a PFC 100 conducts the first and fourth rectifying diodes RD1 to RD4 of the full-bridge rectifier 102 during a half cycle of the AC voltage Vin when the first semiconductor switch Q1 is turned on in response to the switching control signal SCS from the controller 140, thereby allowing a current from the AC voltage source Vin to flow via the first rectifying diode RD1, the inductor L, the first semiconductor switch Q1 and the fourth rectifying diode RD4 in turn. Thus, an input voltage is applied to the inductor L to linearly increase the current iL flowing in the inductor L and store an energy into the inductor L. A current flowing in the inductor L in the turn-on interval of the first semiconductor switch Q1 is fed from the high-frequency capacitor Cf because a diode having a slow conduction time is used as the rectifying diodes RD1 to RD4. Of course, a current, typically a current of 60 Hz flows in the rectifying diodes RD1 to RD4, and a current having a switching frequency flows in the high-frequency capacitor Cf.

Then, if the first semiconductor switch Q1 is turned off in response to the switching control signal SCS, the first diode D1 is conducted to load a reverse voltage, that is, (Vd—a voltage Vd of the charge capacitor, Cd—an absolute value voltage Vi of the high-frequency capacitor Cf) onto the inductor L, thereby linearly decreasing the current flowing in the inductor L. Thus, an energy stored in the inductor L is applied to the charge capacitor Cd to be charged therein. A voltage charged in the charge capacitor Cd is varied in accordance with a switching of the first semiconductor switch Q1 controlled. by the controller 140, and the switching of the first semiconductor switch Q1 is varied in accordance with an input voltage of the PFC 100.

On the other hand, the PFC 100 conducts the second and third rectifying diodes RD2 to RD3 of the full-bridge rectifier 102 during the remaining half cycle of the AC voltage Vin when the first semiconductor switch Q1 is turned on in response to the switching control signal SCS from the controller 140, thereby allowing a current from the AC voltage source Vin to flow via the second rectifying diode RD2, the inductor L, the first semiconductor switch Q1 and the third rectifying diode RD3 in turn. Thus, an input voltage is applied to the inductor L to linearly increase the current iL flowing in the inductor L and store an energy into the inductor L. At this time, the first diode D1 is supplied with a reverse voltage from the charge capacitor Cd to be turned off.

Then, if the first semiconductor switch Q1 is turned off in response to the switching control signal SCS, the first diode D1 is conducted to load a reverse voltage, that is, (Vd—a voltage Vd of the charge capacitor Cd—an absolute value voltage Vi of the high-frequency capacitor Cf) onto the inductor L, thereby linearly decreasing the current flowing in the inductor L. Thus, an energy stored in the inductor L is applied to the charge capacitor Cd to be charged therein. A voltage charged in the charge capacitor Cd is varied in accordance with a switching of the first semiconductor switch Q1 controlled by the controller 140, and the switching of the first semiconductor switch Q1 is varied in accordance with an input voltage of the PFC 100.

Figure 7:
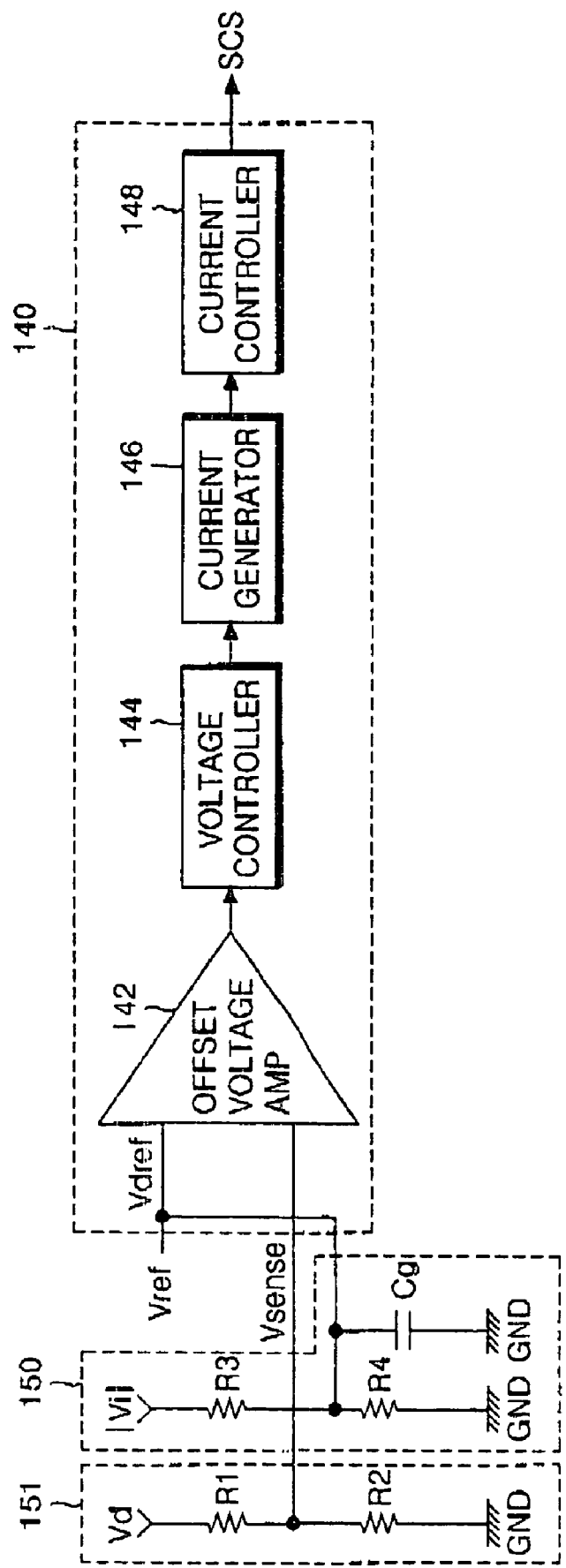
FIG. 7 is a circuit diagram of the controller, the detector and the soft starter shown in FIG. 6.
Figure 8:
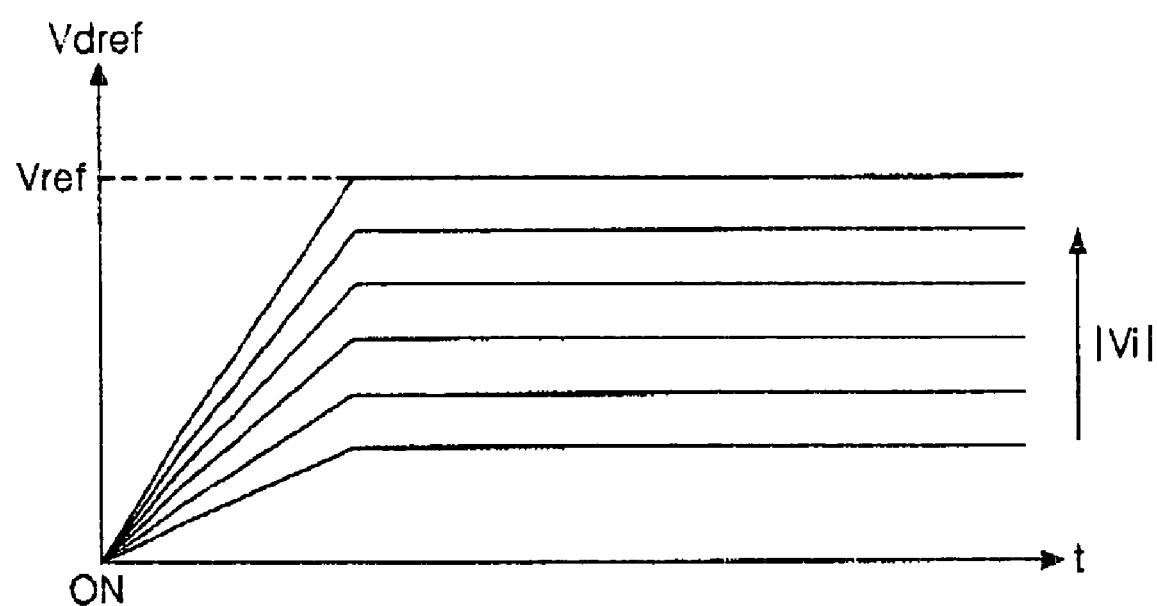
FIG. 8 is a waveform diagram representing a reference voltage supplied to the controller in response to an input voltage supplied to the power factor correction circuit by the soft starter shown in FIG. 7.
Figure 9:
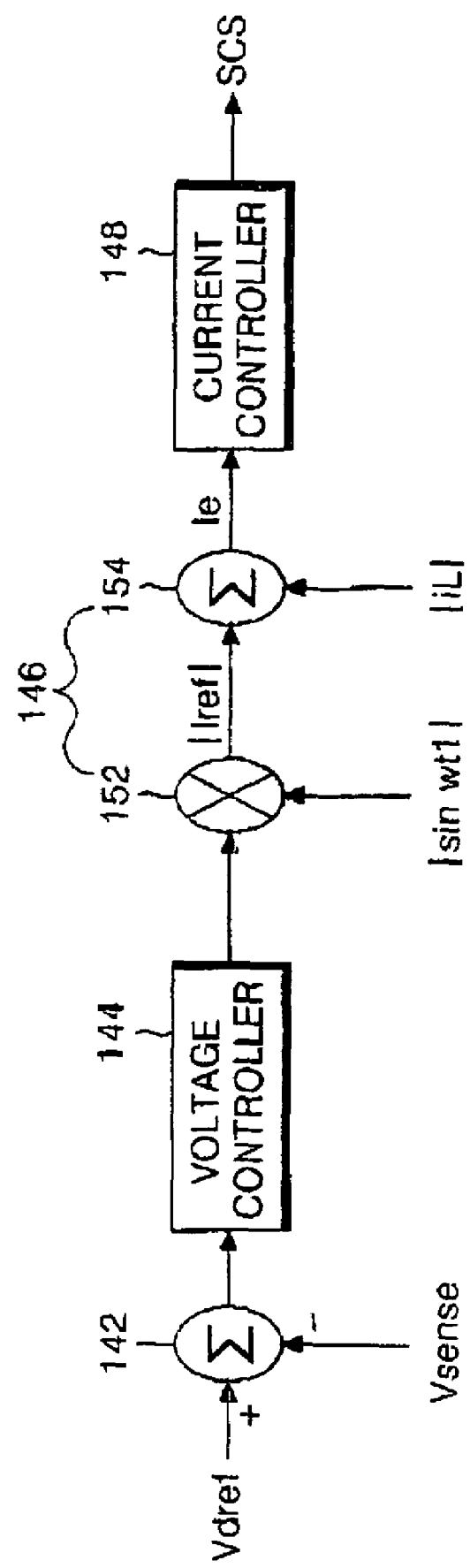
FIG. 9 is a block diagram of the controller shown in FIG. 7.

More specifically, as shown in FIG. 7 and FIG. 9, the controller 140 includes an offset voltage amplifier 142 for amplifying an offset voltage between a reference voltage Vref and the voltage Vd stored in the charge capacitor Cd, a voltage controller 144 for compensating for a voltage applied from the offset voltage amplifier 142, a current generator 146 for converting an output of the voltage controller 144 into a reference current, and a current controller 148 for compensating for the reference current from the current generator 146 to generate the switching control signal SCS. Such a controller 140 is an integrated circuit in which a reference voltage (Vref) generator, a voltage controller, an offset voltage amplifier, a multiplier/divider, a square multiplier, a current controller and a PWM modulator, etc. are built.

The first input terminal of the offset amplifier 142 is connected with the soft starter 150 for applying the reference voltage Vref from the reference voltage generator at the interior of the controller 140 into a voltage corresponding to an input voltage inputted to the PFC 100, whereas the second input terminal thereof is connected with the detector 151 for detecting the voltage Vd of the capacitor Cd charged by voltage-dividing resistors R1 and R2.

The soft starter 150 limits the reference voltage Vref in such a manner to correspond to an input voltage inputted to the PFC 100, and applies the limited reference voltage Vdref to the first input terminal of the offset voltage amplifier 142. To this end, the soft starter 150 includes a third resistor R3 supplied with a voltage Vi of the high-frequency capacitor Cf, a fourth resistor R4 connected between the third resistor R3 and a ground voltage source GND, and a holding capacitor Cq connected between the first input terminal of the offset voltage amplifier 142 connected between the third and fourth resistors R3 and R4 and the ground voltage source GND.

A resistance value of each of the third and fourth resistors R3 and R4 is set to have approximately 1 to 10% lager value than a peak value of the input voltage Vi supplied to the PFC 100.

Such a soft starter 150 charges a voltage Vi of the high-frequency capacitor Cf into the holding capacitor Cg by the third and fourth resistors R3 and R4. A voltage charged in the holding capacitor Cg allows the reference voltage Vref to be linearly increased. Accordingly, the soft starter 150 allows a magnitude of the limited reference voltage Vdref supplied to the first input terminal of the offset voltage amplifier 142 to be differentiated as shown in FIG.

8 in accordance with a magnitude of the input voltage supplied to the PFC 100. More specifically, the soft starter 150 allows the limited reference voltage Vdref supplied to the first input terminal of the offset voltage amplifier 142 to be linearly increased until a reference level in such a manner to fail to instantaneously rise into the reference level using the holding capacitor Cg upon turning-on of the controller 140. In other words, the soft starter 150 allows a large voltage to rise slowly without being applied to the offset voltage amplifier 142 at a time. Herein, such a slow increase of the output voltage is called a soft start.

The first input terminal of the offset voltage amplifier 142 is supplied with the limited reference voltage Vdref corresponding to the input voltage supplied to the PFC 100.

The detector 151 includes a first resistor R1 supplied with the voltage Vd of the charge capacitor Cd that is an output voltage of the PFC 100, and a second resistor R2 connected between the first resistor R1 and the ground voltage source GND. A node between the first and second resistors R1 and R2 is connected to the second input terminal of the offset voltage amplifier 142. The detector 151 detects a detection voltage Vsense of the charge capacitor Cd detected by the voltage-dividing resistors R1 and R2 to apply it to the second input terminal of the offset voltage amplifier 142.

The offset voltage amplifier 142 amplifies an offset between the limited reference voltage, Vdref supplied by limiting the reference voltage Vref by the soft starter 150 and the detected voltage Vsense from the detector 151 as shown in FIG. 9, and applies it to the voltage controller 144.

The voltage controller 144 corrects and outputs the amplified offset voltage from the offset voltage amplifier 142 such that the limited reference voltage Vdref has the same voltage level as the detected voltage Vsense.

As shown in FIG. 9, the current generator 146 includes a multiplier 152 for receiving an absolute value of a sine wave sin wl to multiply the absolute value of the sine wave sin wt by an output from the voltage controller 144, thereby generating a reference current Iref, and an adder 154 for adding an absolute value of the reference current Iref from the multiplier 152 to the current iL of the inductor L. The current generator 146 generates a reference current Iref corresponding to the output from the voltage controller 144 using the sine wave sin wt, and adds the reference current Iref to the current iL of the inductor L to apply the added current Ie to the current controller 148.

The current controller 148 determines a time rate for switching the first semiconductor switch Q1 using the current Ie from the current generator 146 to thereby control the first semiconductor switch Q1.

Such a controller 140 detects an input voltage and an output voltage of the PFC 100 to generate a switching control signal SCS for switching the first semiconductor switch Q1. Thus, a switching of the first semiconductor switch Q1 is differentiated depending upon a magnitude of an input voltage inputted to the PFC 100. In other words, the controller 140 controls the first semiconductor switch Q1 such that the limited reference voltage Vdref fed to the offset voltage amplifier 142 becomes large and thus an output voltage of the PFC 100 also is large when a magnitude of an input voltage inputted to the PFC 100, whereas it controls the first semiconductor switch Q1 such that the limited reference voltage Vdref fed to the offset voltage amplifier 142 becomes small and thus an output voltage of the PFC 100 also is small when a magnitude of an input voltage inputted Lo the PFC 100.

The DC to DC converter 120 is a fly-back converter, and includes a transformer T connected between the first and second terminals of the charge capacitor Cd, a second semiconductor switch Q2 connected between one terminal of a primary wiring of the transformer T and the second terminal of the charge capacitor Cd, an output capacitor Co connected across a secondary wiring of the transformer T, and a second diode D2 connected between one terminal of the secondary wiring of the transformer T and the first terminal of the output capacitor Co.

The transformer T is driven by a driving system of the fly-back converter in accordance with a switching of the second semiconductor switch Q2 to thereby generate a desired DC voltage and apply it to the PDP 130. Alternatively, the DC to DC converter may employ a forward converter and a half-bridge converter, etc. besides the fly-back converter.

The power supply for power factor correction according to the embodiment of the present invention and the driving method thereof detects an input voltage Vi supplied from the AC voltage source Vin to the PFC 100 and detects an output voltage Vd of the PFC 100 with the air of the detector 151. Then, it generates a switching control signal SCS for varying the output voltage Vd in accordance with the input voltage Vi of the PFC 100 using the detected input voltage Vi and the detected output voltage Vd of the PFC 100. Accordingly, the power supply for power factor correction according to the embodiment of the present invention can reduce a current pulsation of the PFC 100 to thereby improve a power factor and an efficiency. In other words, the power supply for power factor correction according to the embodiment of the present invention controls the output voltage Vd of the PFC 100 in such a manner to be approximately 1 to 10% larger than a peak value of the input voltage Vi in accordance with the input voltage Vi of the PFC 100, thereby reducing a difference between the output voltage Vd and the input voltage Vi of the PFC 100 to reduce a pulsation of a current flowing in the inductor L and a switching loss of the diode. The reduction of current pulsation reduces a conduction loss of the semiconductor switch; reduces a core loss of the inductor L (consisting of a hysteresis loss and an eddy current loss caused by a power loss of a magnetic core generated by a magnetized force changed on a time basis); reduces a power loss caused by resistance components of each circuit device, thereby raising a whole efficiency of the power supply. Furthermore, a relatively small EMI filter can be used to improve a power factor.

Figure 10:
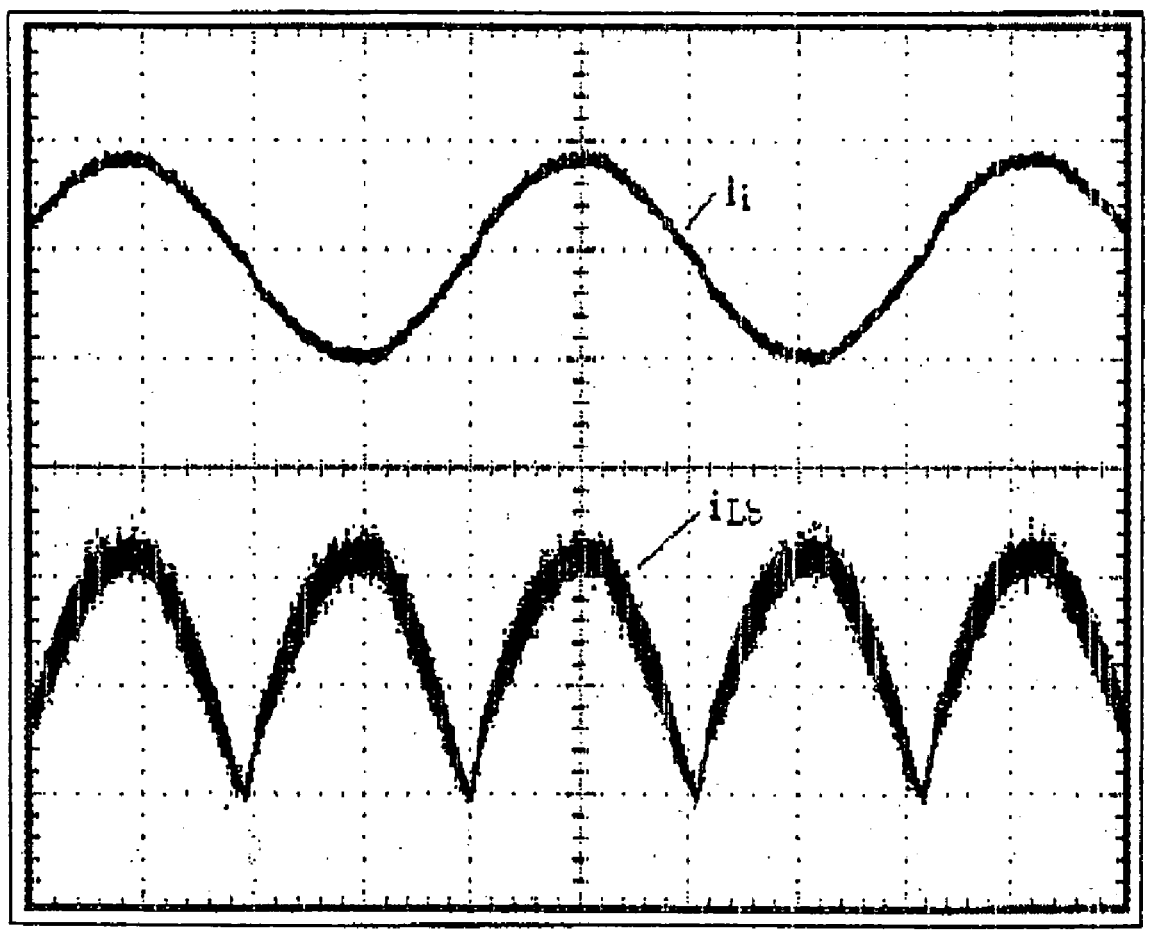
FIG. 10 is a waveform diagram representing an input current inputted to the power factor correction circuit and a current flowing in the inductor by the power supply for power factor correction according to the embodiment of the present invention and a driving method thereof.

As shown in FIG. 10, the power supply for power factor correction according to the embodiment of the present invention and the driving method thereof reduces the current pulsation by a variable control system of the output voltage Vd according to the input voltage Vi of the PFC, thereby raising an efficiency by approximately 5%. Moreover, when an input voltage Vi of the PFC 100 is in a range of 90V to 265V, a power factor in the prior art is 91% to 98% while a power factor in the power supply for power factor correction according to the embodiment of the present invention and the driving method thereof is more than 90%.

As described above, according to the present invention, an input voltage supplied from the AC voltage source to the PFC and an output voltage of the PFC are detected, and the output voltage is varied in accordance with the input voltage of the PFC with the aid of the detected input voltage and the detected output voltage of the PFC. Accordingly, a current pulsation and a current ripple of the PFC can be reduced to improve a power factor and an efficiency. In other words, an output voltage of the PFC is controlled in such a manner to be somewhat larger than a peak value of the input voltage in accordance with the input voltage of the PFC, thereby reducing a difference between the output voltage and the input voltage of the PFC to reduce a pulsation of a current flowing in the inductor and a switching loss of the diode. The reduction of current pulsation reduces a conduction loss of the semiconductor switch as well as a core loss of the inductor and reduces a power loss causes by resistance components of each circuit device, thereby raising a whole efficiency of the power supply. Furthermore, a relatively small EMI filter can be used to improve a power factor.

What is claimed is:

1. A power supply for power factor correction, comprising:
   an alternating current (AC) voltage source;
   a power factor correction circuit for correcting a power factor of a AC voltage supplied from the AC voltage source using a switching device which converts the AC voltage to a direct current (DC) voltage;
   a direct current (DC) to direct current (DC) converter for converting said DC voltage from the power factor correction circuit into a desired DC voltage; and
   a controller for controlling the switching device based on an offset voltage between a reference voltage and said DC voltage output from the power factor correction circuit, to vary said DC voltage of the power factor correction circuit; and
   a limiting circuit which increases the reference voltage at a substantially linear predetermined rate, to thereby limit a maximum value of said DC voltage of the power factor correction circuit to within a predetermined range above a peak value of the AC voltage input into the power factor correction circuit.

2. The power supply as claimed in claim 1, further comprising: a flat panel display device driven based on the desired DC voltage from the DC to DC converter.

3. The power supply as claimed in claim 1, wherein the power factor correction circuit includes:
   a rectifier for rectifying the AC voltage;
   a power factor corrector for correcting a power factor of the rectified voltage from the rectifier in response to a switching control signal from the controller; and
   a charge capacitor for storing an output voltage of the power factor corrector.

4. The power supply as claimed in claim 3, wherein the power factor corrector includes:
   said switching device connected between each output terminal of the rectifier;
   an inductor connected between a first output terminal of the rectifier and the switching device to store an energy supplied from the rectifier in response to a switching of the switching device; and
   a diode connected between the switching device and a first terminal of the charge capacitor to switching said energy stored in the inductor into the charge capacitor in response to a switching of the switching device.

5. The power supply as claimed in claim 4, wherein the power factor corrector further includes: a high-frequency capacitor connected between a node positioned between the first output terminal of the rectifier and the inductor and a second output terminal of the rectifier.

6. The power supply as claimed in claim 5, further comprising:
   a detector for detecting said DC voltage output from the power factor correction circuit and for applying a voltage based on the detected input voltage to the controller; and
   wherein the limiting circuit includes a soft starter for controlling the increase in the reference voltage.

7. The power supply as claimed in claim 6, wherein the controller includes:
   a reference voltage source for generating a reference voltage which is combined with a substantially linearly increasing voltage output from the soft starter at said predetermined rate to form the increased reference voltage input into the controller,
   wherein the controller generates a switching control signal for controlling said switching of the switching device based on the offset voltage, the offset voltage corresponding to a difference between the increased reference voltage input into the controller and said DC voltage detected by the detector.

8. The power supply as claimed in claim 7, wherein the controller includes:
   an offset voltage amplifier for amplifying the offset voltage between the reference voltage linearly increased by the soft starter applied to a first terminal of the amplifier and said DC voltage detected by the detector applied to a second terminal of the amplifier;
   a voltage controller to compensate for an output voltage of the offset voltage amplifier;
   a current generator for generating a reference current using an output voltage and a sine wave from the voltage controller and said inductor current; and
   a current controller for generating said switching control signal using said reference current from the current generator.

9. The power supply as claimed in claim 8, wherein the detector includes:
   a first resistor supplied with an output voltage of the charge capacitor; and
   a second resistor connected between the first resistor and a ground voltage source, wherein a first node between the first resistor and the second resistor is connected to a second terminal of the offset voltage amplifier.

10. The power supply as claimed in claim 8, wherein the soft starter includes:
    a third resistor supplied with a voltage of the high-frequency capacitor;
    a fourth resistor connected between the second resistor and the ground voltage source; and
    a holding capacitor connected between a second node positioned between the third and fourth resistors and the ground voltage source, the holding capacitor having a capacitance value which controls the reference signal to linearly increase at the substantially predetermined rate to limit the maximum value of said DC voltage of the power factor correction circuit to within said predetermined range above a peak value of the AC voltage input into the power factor correction circuit, said second node being connected to the first terminal of the offset voltage amplifier.

11. The power supply as claimed in claim 10, wherein resistance values of the third and fourth resistors are set to limit the maximum value of said DC voltage of the power factor correction circuit to within approximately 1 to 100% larger than the peak value of the AC voltage input into the power factor correction circuit.

12. The power supply as claimed in claim 8, wherein the current generator includes:
    a multiplier for outputting a current corresponding to said output voltage of the voltage controller using said output voltage and said sine wave from the voltage controller; and an adder for generating said reference current using said current outputted from the multiplier and said inductor current.

13. A method of driving a power supply for power factor correction, comprising:
   correcting a power factor of an AC voltage supplied from an AC voltage source using a power factor correction circuit having a switching device and converting said AC voltage into a DC voltage;
   converting said converted DC voltage into a desired DC voltage using a DC to DC converter; and
   controlling the switching device based on an offset voltage between a reference voltage and said converted DC voltage, to vary an output voltage of the power factor correction circuit, said controlling including:
   increasing the reference voltage at a substantially linear predetermined rate to limit a maximum value of said converted DC voltage to within a predetermined range above a peak value of the AC voltage input into the power factor correction circuit.

14. The method as claimed in claim 13, further comprising: driving a flat panel display device based on the desired DC voltage from the DC to DC converter.

15. The method as claimed in claim 13, wherein said correcting includes:
   rectifying said AC voltage using a full-bridge rectifier;
   storing an energy supplied from the rectifier in response to a switching of the switching device using an inductor;
   charging said energy stored in the inductor into a charge capacitor in response to said switching of the switching device using a diode.

16. The method as claimed in claim 15, wherein said correcting further includes: smoothing an energy supplied from the rectifier to the inductor using a high-frequency capacitor.

17. The method as claimed in claim 16, further comprising:
   detecting an output voltage of the power factor correction circuit using a voltage-dividing resistance network which includes first and second resistors, the output voltage corresponding to or being based on said converted DC voltage; and
   increasing the reference voltage using a soft-start circuit which includes voltage-dividing resistance network of third and fourth resistors and a holding capacitor, the holding capacitor having a capacitance value which controls the reference signal to linearly increase at the substantially predetermined rate to limit the maximum value of said converted DC voltage to within said predetermined range above a peak value of the AC voltage input into the power factor correction circuit.

18. The method as claimed in claim 17, wherein resistance values of the third and fourth resistors are set to limit the maximum value of said DC voltage of the power factor correction circuit to within approximately 1 to 10% larger than the peak value of the AC voltage input into the power factor correction circuit.

19. The method as claimed in claim 17, wherein said controlling includes:
   generating a first reference voltage which is combined with a substantially linearly increasing voltage output from the soft starter at said predetermined rate to form a second reference voltage that is input into the controller to generate the offset voltage; and
   generating said switching control signal for controlling said switching of the switching device based on the offset voltage.

20. The method as claimed in claim 19, wherein generating said switching control signal includes:
   amplifying a difference between said second reference voltage linearly increased by the soft-start circuit and said converted DC voltage using an offset voltage amplifier, said difference corresponding to the offset voltage;
   compensating for an output voltage of the offset voltage amplifier;
   generating a reference current based on the compensated output voltage, a sine wave and said inductor current; and
   generating said switching control signal based on said reference current.

21. The method as claimed in claim 20, wherein generating said reference current includes:
   generating a current corresponding to said compensated output voltage and said sine wave; and
   generating said reference current based on said current and said inductor current.

* * * * *